(12) United States Patent
Kingsbury et al.

(10) Patent No.: US 8,560,524 B2
(45) Date of Patent: Oct. 15, 2013

(54) ALLOCATING PRIORITIES TO PREVENT DEADLOCKS IN A STORAGE SYSTEM

(75) Inventors: Brent A. Kingsbury, Beaverton, OR (US); Terence M Rokop, Aloha, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 517 days.

(21) Appl. No.: 12/261,064

(22) Filed: Oct. 30, 2008

(65) Prior Publication Data

US 2010/0114849 A1    May 6, 2010

(51) Int. Cl.
*G06F 17/30* (2006.01)
*G06F 7/00* (2006.01)

(52) U.S. Cl.
USPC .......................................................... 707/718

(58) Field of Classification Search
USPC ........ 707/999.008, 999.2, 822, 999.002, 718; 718/104
See application file for complete search history.

(56) References Cited

U.S. PATENT DOCUMENTS

| | | | |
|---|---|---|---|
| 5,317,739 A * | 5/1994 | Elko et al. .................... 709/216 |
| 5,940,813 A * | 8/1999 | Hutchings ....................... 705/43 |
| 6,148,333 A | 11/2000 | Guedalia | |
| 6,175,900 B1 | 1/2001 | Forin | |
| 6,963,882 B1 * | 11/2005 | Elko et al. ................. 707/999.2 |
| 7,100,089 B1 | 8/2006 | Phelps | |
| 7,243,115 B2 | 7/2007 | Manley | |
| 7,328,305 B2 | 2/2008 | Kleiman | |
| 7,533,137 B1 | 5/2009 | Timpanaro-Perrotta | |
| 7,539,988 B1 | 5/2009 | Hersh | |
| 7,698,708 B1 * | 4/2010 | Lent et al. ...................... 718/104 |
| 7,873,619 B1 | 1/2011 | Faibish | |
| 7,890,555 B2 * | 2/2011 | Gunda et al. .................. 707/822 |
| 2003/0182389 A1 | 9/2003 | Edwards | |
| 2005/0246397 A1 | 11/2005 | Edwards | |
| 2005/0246612 A1 | 11/2005 | Leis | |
| 2006/0161678 A1 | 7/2006 | Bopardikar | |
| 2006/0282471 A1 | 12/2006 | Mark | |
| 2006/0288026 A1 | 12/2006 | Zayas | |
| 2007/0282977 A1 | 12/2007 | Yano | |
| 2008/0005133 A1 | 1/2008 | Khalidi | |
| 2008/0133538 A1 | 6/2008 | Chavez | |
| 2008/0172430 A1 | 7/2008 | Thorstensen | |
| 2008/0275925 A1 | 11/2008 | Kimmel | |
| 2009/0019047 A1 * | 1/2009 | Anderson et al. ...... 707/999.008 |
| 2009/0193122 A1 * | 7/2009 | Krishamurthy ............... 709/226 |
| 2009/0271456 A1 | 10/2009 | Kushwah | |
| 2010/0049754 A1 | 2/2010 | Takaoka | |
| 2010/0057992 A1 | 3/2010 | Hahn | |
| 2010/0115009 A1 | 5/2010 | Callahan | |
| 2010/0115011 A1 | 5/2010 | Callahan | |
| 2010/0125583 A1 | 5/2010 | Casper | |
| 2010/0131474 A1 | 5/2010 | Zayas | |

FOREIGN PATENT DOCUMENTS

| | | |
|---|---|---|
| WO | 2010050943 A1 | 5/2010 |
| WO | 2010050944 A1 | 5/2010 |

* cited by examiner

*Primary Examiner* — Sathyanarayan Pannala

(57) ABSTRACT

One embodiment is a server in a cluster storage system. The server includes a Global Lock Manager (GLM) that receives requests for lock priorities for transactions from local lock manager (LLMs) in the cluster storage system. The GLM prevents deadlocks in the cluster storage system by issuing groups of priorities for transactions to the LLMs.

17 Claims, 4 Drawing Sheets

ALLOCATING PRIORITIES TO PREVENT DEADLOCKS IN A STORAGE SYSTEM

CROSS-REFERENCE TO RELATED APPLICATIONS

This application relates to the following patent applications which are filed concurrently herewith and incorporated herein by reference: PCT/US2008/081661 entitled CREATING SNAPSHOTS OF A FILE SYSTEM; application Ser. No. 12/261,068 entitled MANAGING COUNTERS IN A DISTRIBUTED FILE SYSTEM; PCT/US2008/081664 entitled ONLINE CHECKING OF DATA STRUCTURES OF A FILE SYSTEM; application Ser. No. 12/261,069 entitled TRACKING MEMORY SPACE IN A STORAGE SYSTEM; and application Ser. No. 12/261,071 entitled ENUMERATING METADATA IN FILE SYSTEM DIRECTORIES.

BACKGROUND

Deadlocks can occur in computer systems that use locking for synchronization when cycles occur in the directed graphs of lock waits. Such deadlocks can halt processing, crash programs, or significantly reduce computing efficiency. As such, various different schemes have been developed to avoid deadlocks.

Some traditional schemes use global serializing operations around possible deadlock situations. Such schemes avoid a deadlock at the expense of severely limiting potential parallel processing. Additional schemes attempt to impose a convention of deadlock avoidance by defining a-priori lock hierarchies that always acquire locks in the same global order. Such locks are often acquired with mediating or global ordering locks at the expense of unnecessary lock acquisitions when no conflicts exist. Still other methods require observing all current lock operations in the system with graph operations to detect cycles (deadlocks) and resolve them with a set of heuristic techniques. For instance, some schemes use a centralized lock manager that must be able to examine all lock states in the system.

These prior schemes to avoid deadlocks pose problems in clustered file systems and other clustered software (e.g., database application software written to exploit the inherent parallelism of a clustered environment) that try to coordinate the actions of otherwise potentially conflicting operations across multiple cluster nodes.

BRIEF SUMMARY OF THE INVENTION

One example embodiment is a method in which a global lock manager receives requests for lock priorities from local lock managers in a clustered file system. In order to prevent deadlocks in the clustered file system, the global lock manager issues groups of lock priorities to each of the local lock managers for subsequent apportionment to filesystem state transactions with all lock requests performed on behalf of each said transaction operating with the lock priority so assigned.

DETAILED DESCRIPTION

Figure 1:
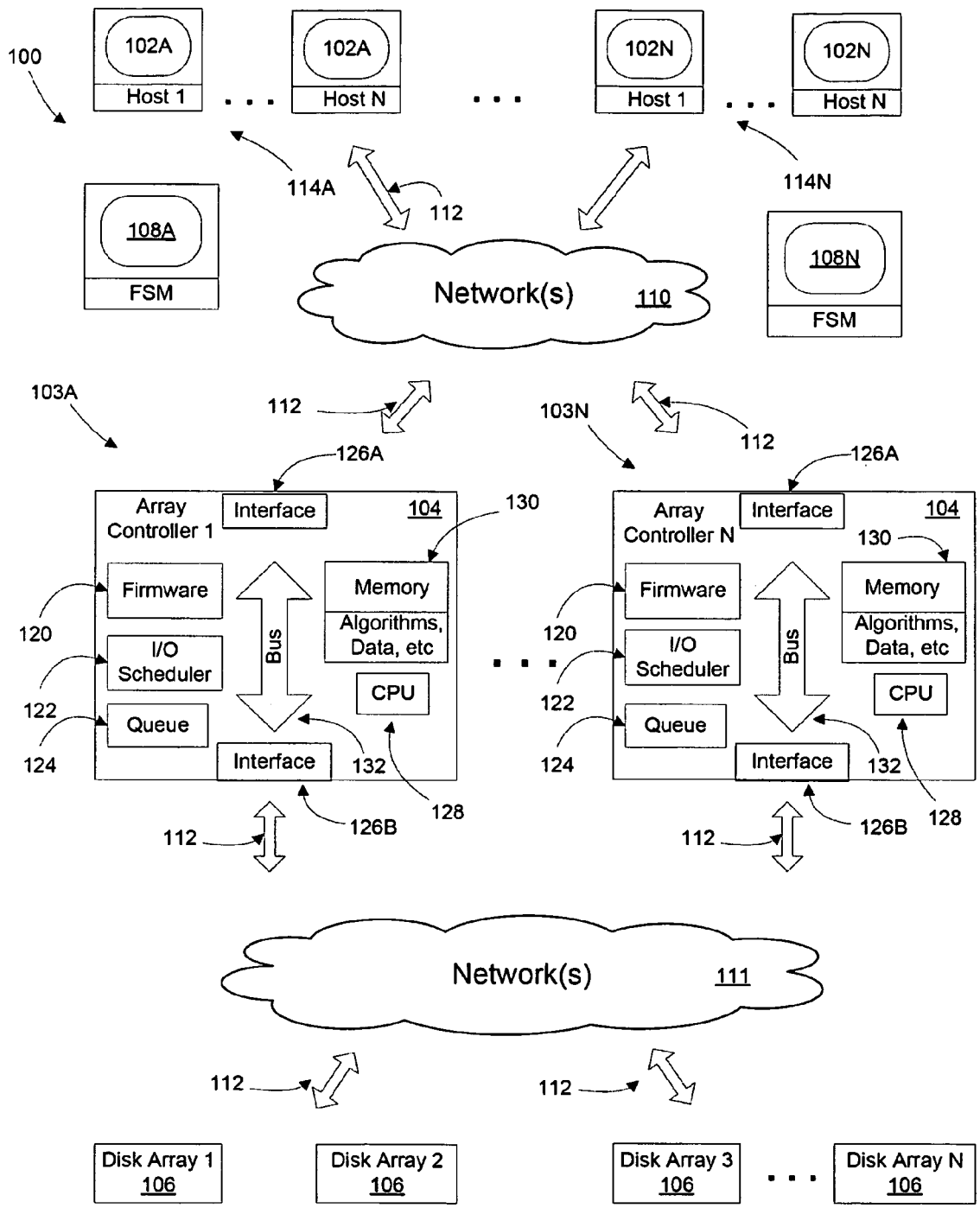
FIG. 1 shows a clustered file system in accordance with an exemplary embodiment of the present invention.

Exemplary embodiments relate to methods and systems to prevent deadlocks. One embodiment assigns lock priorities to filesystem state transactions created on behalf of clustered filesystem operations. Threads or processes executing on one or more nodes in a cluster request the lock priorities. The lock priorities, in turn, are assigned to each transaction to avoid deadlocks between filesystem state transactions and their respective lock transactions.

Exemplary embodiments use batches of lock priorities to allow a priority system for preventing deadlock in clustered filesystems. The priority scheme enables transactions to execute efficiently in the cluster with little allocation overhead for obtaining the lock priorities. Furthermore, time synchronization is not required across the nodes of the cluster, and the encoding of lock priorities is represented by a relatively small number of bits.

Exemplary embodiments provide systems and methods to resolve potential deadlock conflicts without resorting to global serializing operations or to the introduction of a mechanism able to observe all lock states in the distributed system. Exemplary embodiments thus allow for higher degrees of potential parallel processing without the introduction of a-priori lock mediation schemes.

In one exemplary embodiment, global cluster-wide lock priority assignments are used to avoid or prevent deadlocks. Each filesystem operation is performed as a series of one or more filesystem state transactions. Each such transaction acquires one or more locks from a Local Lock Manager (LLM). The LLM, in turn cooperates with a global lock manager (GLM) or a Cross-node Lock Manager (XLM) to acquire locks when locally cached lock states within the LLM are insufficient to resolve a lock request. The LLM also cooperates with the GLM or XLM to assign a cluster-wide priority to each newly created transaction such that no two simultaneous open transactions in the cluster will ever have the same priority. Since locks are in turn acquired on behalf of a particular transaction, all locking operations for a particular transaction have the same lock priority.

Groups of lock priorities are granted to each cluster node and its corresponding LLM when needed. The groups of lock priorities so granted are interleaved. Specifically, each group of lock priorities is described by a beginning value (the first global priority in the group) and the number of lock priorities granted in the group. In one embodiment, all nodes receive the same group of lock priorities whenever a node (LLM) needs more lock priorities. Each node (LLM) concatenates its node ranking within the cluster to each priority allocated from the most recently granted group of lock priorities to create a lock priority value that is unique throughout the cluster.

In some instances, a filesystem state transaction is created that requires one or more locks, with the locks to be acquired not already guaranteed to be safe from deadlock (e.g., by virtue of locks already held for operations in progress on behalf of related transactions). Here, a globally unique cluster-wide lock priority is assigned to the transaction. This lock priority is allocated and assigned to the transaction by consuming the next lock priority from the group of available lock priorities that were most recently granted to the LLM. This includes the local node ranking in the final lock priority value. This process continues in all LLMs as lock priorities are needed. The process halts when any node (LLM) exhausts the most recently granted group of lock priorities given to it. At this point, the LLM issues a request to obtain the next available batch of lock priorities from the GLM. The GLM then grants all LLMs in the cluster the next interleaved batch of global priorities.

Filesystem threads block (i.e., wait) to acquire locks with the priority present in the transaction for which the lock is being acquired. If the LLM detects that a lock is to be acquired by a transaction wherein the lock to be acquired is held by a transaction of lower priority, then the higher priority locking operation waits while the lower priority transaction either completes without any new locks needing to be acquired on its behalf or else is instructed to abort. The instruction to abort is immediately delivered if the lower priority transaction is blocked on a lock acquisition. Otherwise, the lower priority transaction is instructed to abort the next time it attempts to acquire a lock. As mentioned above, it is also possible that the lower priority transaction will complete without acquiring any more locks. In this situation, deadlocks are avoided, and the higher-priority transaction will be granted its lock request when the lower-priority transaction unlocks the locks acquired on its behalf.

Exemplary embodiments in accordance with the invention allow for higher degrees of potential parallelism without the introduction of a-priori lock mediation schemes. Exemplary embodiments resolve such deadlocks and conflicting lock operation ordering though the efficient implementation of lock priorities without time synchronization requirements.

FIG. 1 shows a distributed or clustered file storage system 100 in accordance with an exemplary embodiment of the present invention. By way of example, the system is a clustered storage network and/or a storage area network (SAN) that includes a plurality of client computers, nodes, or host computers 102A to 102N and one or more storage devices or arrays 103A to 103N that include one or more storage controllers 104 (shown by way of example as an array controller), a plurality of storage devices 106 (shown by way of example as disk array 1 to disk array N), and a plurality of file system storage managers (FSM) 108A to 108N in communication with the storage controllers and devices. The filesystem storage managers 108A to 108N store and organize computer files so the files and corresponding data can be managed and discovered for the nodes or hosts 102A to 102N. In one exemplary embodiment, the filesystem storage managers are replicated on all cluster nodes or hosts (i.e., an instance of the operating system and filesystem implementation exist on each host or each node in a cluster).

The host computers are grouped to form one or more clusters (shown as cluster 114A to 114N). For example, nodes or hosts 102A are grouped to form a one cluster 114A which includes a plurality of host computers (shown as host 1 to host N). Nodes or hosts 102N are grouped to form another cluster 114N.

The clusters 114A to 114N and file system storage managers 108A to 108N are coupled to the array controllers 104 through one or more fabrics or networks 110, and the storage devices or arrays 103 are coupled to the storage devices 106 through one or more fabrics or networks 111. For instance, the hosts communicate with an array controller using a Small Computer System Interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one exemplary embodiment, the storage devices (such as array controller 104 and disk arrays 106) are network attached devices providing random access memory (RAM) and/or disk space (for storage and as virtual RAM) and/or some other form of storage or storage device, such as magnetic memory (example, tapes), micromechanical systems (MEMS), or optical disks, to name a few examples. Typically, storage devices include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the storage devices include one or more servers.

The storage controller 104 manages various data storage and retrieval operations. Storage controller 104 receives I/O requests or commands from the host computers 102A to 102N, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102A to 102N. For instance, processor 128 is coupled to a host interface 126A that provides bidirectional data communications to one or more host computers 102A to 102N. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

Issuance of lock priorities assigned to transactions which in turn carry out one or more lock acquisitions in the storage system is not dependent on absolute time or ordering. Instead, issuance of priorities (their actual numerical value) generally increases over time, until the maximum numerical lock priority value (MNLPV) of the embodiment is reached. At this time, the numerical priority value "wraps" and starts over again at or near zero. With the numerical value of lock priorities otherwise increasing with each allocation, any lock priority A with a numerical value less than the numerical value of lock priority B generally indicates that the transaction with priority A was created before the transaction with priority B. This implied time order means that priority A is more important (is higher than) priority B. Hence, a lock request on behalf of a transaction with priority A should abort any transaction with priority B if the latter transaction has an outstanding lock request enqueued to acquire a conflicting lock subsequently sought by a lock request of transaction A.

Lock priority values can eventually "wrap" (start over again at or near zero) if the entire possible range of lock priority values is consumed by sufficient use. To maintain the implicit mapping of time to an actual lock priority numerical value, this forces the lock priority comparison operation to account for this cycling of lock priority values. The lock priority comparison operation is described by the following pseudo-code:

```
IF numerical value of lock priority A < numerical value of lock
priority B THEN
    IF numerical value of priority B
             − numerical value of priority A <= MNLPV / 2 THEN
        Lock priority A is higher priority than lock priority B
    ELSE
        Lock priority A is lower than lock priority B
    FI
ELSE
    IF numerical value of priority A
             − numerical value of priority B > MNLPV / 2 THEN
        Lock priority A is lower priority than lock priority B
    ELSE
        Lock priority A is higher priority than lock priority B
    FI
FI
```

The wrapping of lock priorities also means that it is possible for a previously used lock priority to be used again. This problem is addressed in the embodiment by ensuring that the total number of lock priority values is sufficiently large. The size of these values renders the wrapping case so infrequent that any filesystem transaction using a given lock priority will have long completed before there is any chance of the same locking priority being granted again, or indeed even getting halfway through a complete cycle of the total lock priority numerical space. If somehow a lock priority value is still reused when the transaction which previously used the same priority value is still in flight, the LLM (which among other things, tracks all presently in use lock priorities) simply allocates the next available lock priority until no reuse collision exists. In this way, any collision caused by reuse of lock priorities within a single node is prevented. Any collision that could otherwise occur between nodes of the cluster is inherently avoided by virtue of each node combining its own rank with each lock priority allocated from the group of lock priorities granted to it.

With exemplary embodiments, strict adherence to sequentially increasing lock priority values is not absolutely required. Instead, only some reasonable approximation of the time at which a lock priority is assigned to a particular transaction is recorded. Here, the lock priority is assigned to ensure that each transaction competes on reasonably equal footing with all other transactions. By way of example, the following sequence illustrates a strict adherence to providing lock priorities in a numerically sequentially increasing order which is irrespective of the node where the various transactions are being created:

Transaction 1 is assigned lock priority 1;
Transaction 2 is assigned lock priority 2;
Transaction 3 is assigned lock priority 3;
Transaction 4 is assigned lock priority 4;
Transaction 5 is assigned lock priority 5;
Etc.

As shown in this sequence, lock priorities are distributed to transactions in perfect consecutive numerical order (i.e., 1, 2, 3, 4, 5, etc.). With exemplary embodiments, however, lock priorities are not necessarily allocated in a consecutive numerical order exactly matching the time at which they were allocated. Instead, lock priorities (that is, their actual numerical value) mostly increase over time in the clustered file system, and eventually wrap.

Figure 4:
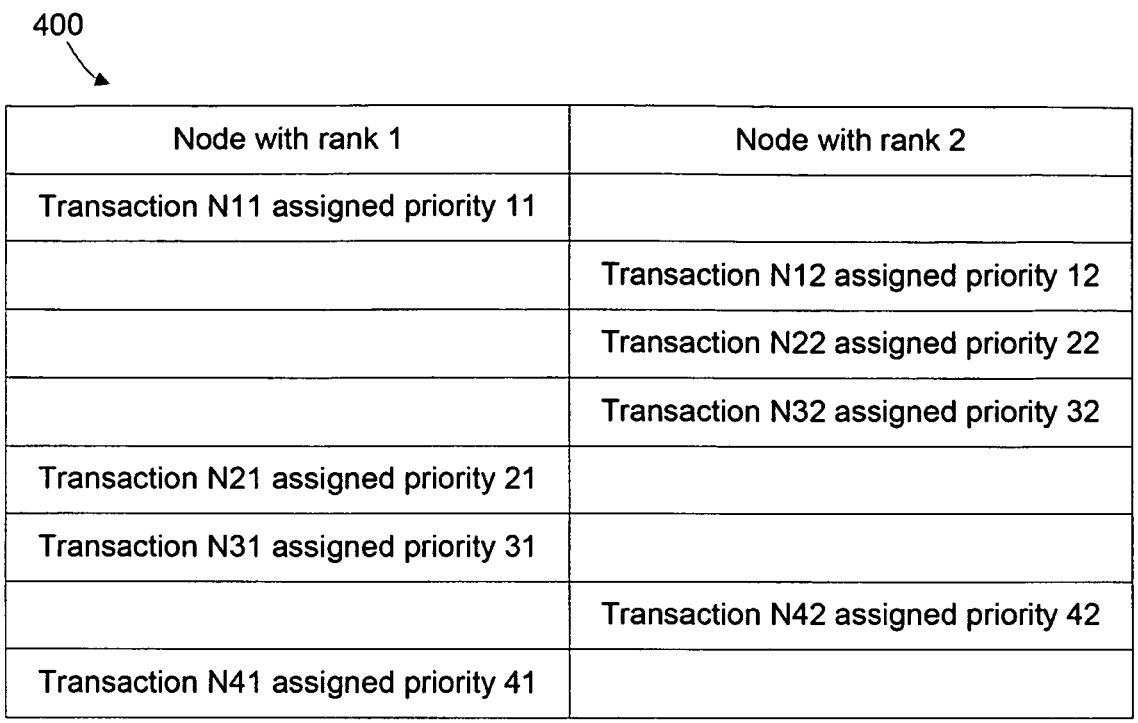
FIG. 4 shows a sequence of lock priorities distributed to transactions in a non-consecutive numerical order in accordance with an exemplary embodiment of the present invention.

An exemplary sequence 400 is shown in FIG. 4 which illustrates this principle on two nodes of the cluster. In this sequence, the most recently granted group of lock priorities begins at one (remember however that each node will concatenate their own node rank with each lock priority pulled from the most recently granted group of lock priorities), and where time marches forward with each successive line.

As shown in FIG. 4, lock priority values mostly increase over time, but do not follow consecutive numerical order (i.e., 1, 2, 3, 4, 5, etc.). Instead, the lock priorities follow a somewhat random ordering that mostly increases with time (i.e., 11, 12, 22, 32, 21, 31, 42, 41, etc.).

The ordering scheme in accordance with exemplary embodiments is not completely fair since some transactions receive better lock priorities even though such transactions began later in time. For example, transaction N32 is assigned lock priority 32, while transaction N21 which began later in time, has a lower lock priority value of 21. When the lock priority value of 21 is compared with the lock priority of 32, the result makes it appear that transaction N21 began before transaction N32, when these transactions instead began in the other order. Thus, a priority discrepancy differing from the time order of the transactions can occur in the issuance of lock priorities.

This priority discrepancy occurs because cluster nodes are allocated groups of priorities. While all nodes receive the next group of lock priorities whenever any one single node needs the next group of lock priorities, the respective LLMs for each of the nodes apportion the lock priorities to the transactions as they are needed. Small discrepancies occur because threads in clusters are performing various filesystem operations at different paces. In the exemplary sequence 400 of FIG. 4, the node with rank 1 was the first to create a transaction which then needed to acquire a lock before the second node created a transaction requiring a lock priority to be allocated. The second node, however, subsequently created transactions at a faster rate that the first node.

Regardless of such priority discrepancies, lock priority values across the storage system mostly increase over time, wrapping when needed, with the lock priority values approximating the passage of time. This scheme significantly increases performance of the storage system. By granting lock priorities in batches from the GLM to the LLM, the LLMs are not required to request lock priorities from the GLM for each transaction. Rather, the LLMs can request batches of priorities each of which will allow the LLMs to serve several local transactions without further communication with the GLM. The requests for priorities are not eliminated, but are greatly reduced in frequency. Reducing such requests to the GLM increases efficiency and speed with which transactions are executed since lock priorities are locally distributed.

Figure 2:
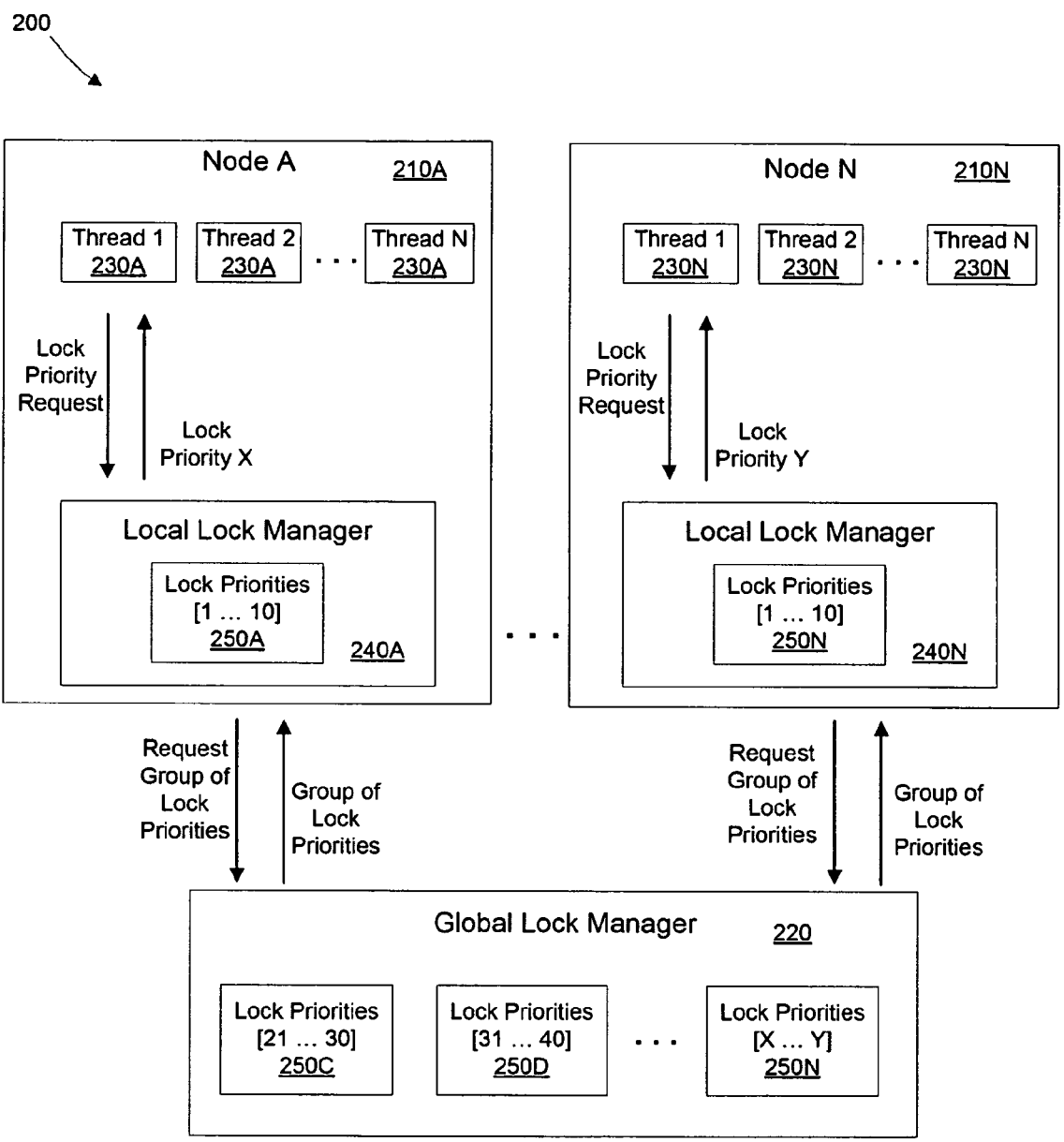
FIG. 2 shows a diagram for distributing locks and lock priorities in a clustered file system in accordance with an exemplary embodiment of the present invention.

FIG. 2 shows a diagram for distributing lock priorities in a cluster file system 200 in accordance with an exemplary embodiment of the present invention. The system includes a plurality of nodes (shown as node 210A to 210N) coupled to Global Lock Manager 220. In one exemplary embodiment, the GLM is a server.

Each node includes one or more threads of execution (node A having threads 230A and node N having threads 230N) and a Local Lock Manager (node A having LLM 240A and node N having LLM 240N).

The GLM 220 includes groups of lock priorities 250C, 250D, to 250N. Each group of lock priorities has multiple priorities for transactions. For illustration, the groups of lock priorities are shown with ten priorities, but the number of priorities can be smaller or much larger and established by a user. In FIG. 2, the same group of lock priorities is given to each node (LLM) when any LLM indicates that the next batch of lock priorities is needed, and each node then tacks on its node rank to the resulting lock priority.

As shown, the cluster nodes make lock priority requests to the GLM 220 which, in turn, issues new groups of lock priorities to all LLMs (nodes) of the cluster. For example, LLM 240A makes a request for lock priorities and is issued lock priorities 250A which include lock priorities [1 . . . 10], but which when combined with the rank of node A will describe lock priority values which are unique across the cluster. Since the issuance of lock priorities to any LLM (node) results in all LLMs (nodes) receiving the same new lock priority group, LLM 240N also receives the same group of lock priorities [1 . . . 10], which when combined with the rank of node N describe similarly unique cluster-wide priority values as for LLM 240A. The lock priorities received from the GLM are then stored and are accessible by the LLM of each node in the cluster. Thereafter, a thread or process in a node requests the creation of a transaction and then subsequently issues one or more lock requests to its LLM on behalf of the transaction so created. For example, thread 1 (230A) in node 210A is shown creating such a transaction, and then subsequently making a lock request to LLM 240A which, in turn observes that the transaction on whose behalf the lock request is being made has no lock priority assigned. LLM 240A then allocates and assigns lock priority X to the transaction (where X is a number designating a lock priority). Similarly, a transaction created by thread 1 (230N) on node N is shown receiving lock priority Y (where Y is a number designating a lock priority).

In one exemplary embodiment, the LLMs issue the lock priorities in consecutive, numerical, sequential order, concatenating the rank of the local node with each lock priority value allocated from the group of lock priorities last given to it. For example, LLM 240A issues the first request priority 1A, the second request priority 2A, the third request priority 3A, etc., where A denotes the rank membership of node A within the cluster. When the group of lock priorities last given to the LLM 240A from the GLM 220 are depleted or near exhaustion, the LLM makes a request to the GLM 220 for another group of lock priorities. The request is subsequently granted to all LLMs (nodes) of the cluster so that all nodes compete on a reasonably equal basis with respect to all lock priorities subsequently allocated from the most recently granted group of lock priorities from the GLM.

Figure 3:
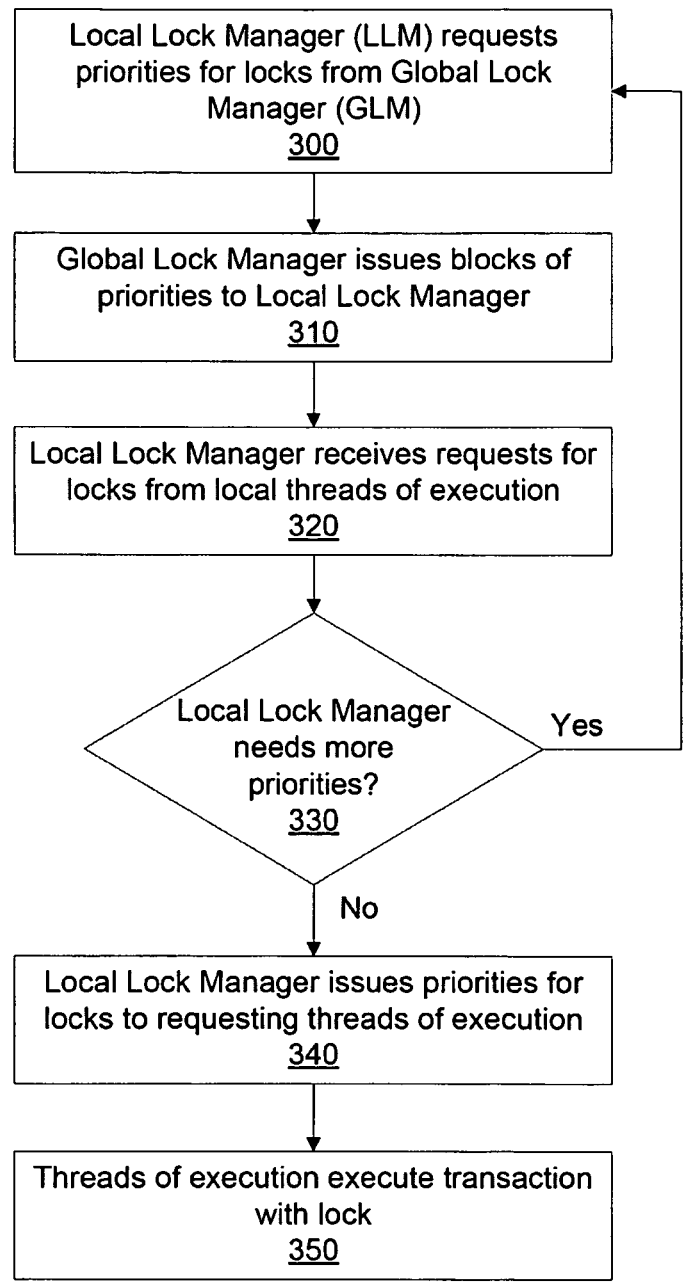
FIG. 3 shows a flow diagram for preventing deadlocks and distributing lock priorities in a cluster file system in accordance with an exemplary embodiment of the present invention.

FIG. 3 shows a flow diagram for preventing deadlocks and distributing lock priorities in a cluster file system in accordance with an exemplary embodiment of the present invention.

According to block 300, a Local Lock Manager (LLM) requests priorities for transactions from a Global Lock Manager (GLM). For example, a LLM requests one or more lock priorities from the GLM. In one embodiment, the GLM holds all priorities for the cluster file system.

According to block 310, the Global Lock Manager issues groups of lock priorities to the requesting Local Lock Managers and all other LLMs. These groups of priorities include one or more priorities for transactions for which one or more locks will be requested by local threads in the future. Whenever any LLM requests a new batch of global priorities, all LLMs (all nodes) receive the new batch. Thus, exemplary embodiments issue (grant) groups of lock priorities to all LLMs (all nodes) whenever any node asks for another batch of lock priorities.

According to block 320, the Local Lock Manager receives requests for locks from local threads executing filesystem state transactions. When a transaction in a node needs a lock, a request is made to the LLM, as opposed to being made to the GLM.

According to block 330, if the deadlock avoidance requirements of any of the lock requests require a lock priority and no lock priority has yet been assigned to the respective transactions for which the locks are to be acquired, then lock priorities are assigned to the requisite transactions as needed. For each such lock priority allocated, a question is asked whether the Local Lock Manager needs more priorities. If the answer to the question is "yes" then the LLM makes requests for another group of priorities from the GLM. If the answer to the question is "no" then flow proceeds to block 340.

According to block 340, the Local Lock Manager assigns lock priorities to the transactions which did not have them assigned previously, for all of the lock requests requiring a lock priority to avoid any otherwise possible deadlocks. According to block 350, the requesting transaction being executed by a particular thread receives the lock and executes the transaction.

With exemplary embodiments, lock priority values are encoded using a relatively small number of bits and do not rely on time being synchronized across all nodes of the cluster.

Lock priority assignment in a clustered environment of multiple nodes with perfect time synchronization across all nodes can be implemented as tuples of absolute time. Here, the time is concatenated with an identifier that uniquely identifies the transaction within the node which acquired the lock priority and is also concatenated with an identifier uniquely identifying each node.

The absolute time part of the lock priority encodes the relative "age" of the request requiring the lock priority. That is, requests that begin earlier in time have lock priority values indicating a higher priority than requests that begin later in time.

In some embodiments, however, absolute time alone is not enough to assign lock priorities since two operations can begin at the same time. Exemplary embodiments ensure that two or more operations beginning at exactly the same time within the same node, but each for different transactions, have lock priority values with a unique ordering of all such operations. Assigning a unique identifier (a transaction ID) to each transaction and then including the transaction-ID in the lock priority resolves potential ties between transactions of the same node.

Similarly, exemplary embodiments also ensure that two or more operations beginning at exactly the same time on two or more nodes wherein the transaction-IDs of the requesting transactions just happen to be identical also have a clear and unique ordering. Assigning a unique identifier to each node and then including that identifier in each lock priority value resolves such potential ties between nodes.

By way of example, one possibility is to use 64-bits to encode time, another 32-bits to encode transaction-ID (presuming no more than $2^{32}$ transactions in flight at any single time per node), and N bits to encode a unique node-ID (presuming no more than $2^N$ nodes within the cluster). In this example, 96+N bits are used to encode a lock priority. This number of bits (i.e., 96+N) may be too large in some embodiments. Specifically, to accomplish lock operations in a clustered environment, messages are sent to and received from (via the underlying operating system networking implementation) all of the nodes in the cluster.

Typically, the networking layer of a given operating system is optimized to deliver and receive small messages more quickly than large messages. To exploit the faster network delivery of small messages, and hence to provide faster lock acquisition response times, the GLM (which is sending and receiving lock requests to and from all nodes in the cluster), ensures that its lock request messages are commensurately sized to be small messages. This in turn places constraints on how much space is available in each lock request message to describe the lock priority of the request. Therefore, exemplary embodiments implement lock priority values using a relatively small number of bits (typically 32 or 64) in order to meet the small message constraints required to exploit the fastest possible network message delivery path between nodes in the cluster.

As discussed in more detail below, one exemplary embodiment implements multiple classes of lock priorities.

Filesystem operations can proceed by first acquiring the necessary logical locks and then serializing otherwise racing concurrent modifications to logical filesystem entities, such as files and directories. As such, these locks are not tied to specific blocks or storage locations within the filesystem.

A second component, however, does exist in the operations of many filesystems. Namely, a second phase of the operation involves operations on specific blocks or storage locations of the filesystem. These locks are sometimes termed physical locks since the lock(s) being acquired correspond to specific storage locations within the filesystem wherein the specific locks to be acquired are determined by the block-ID or storage location address within the filesystem being accessed or modified. These locks are tied to the filesystem storage location and frequently protect the state of filesystem metadata (i.e., the state that the filesystem uses to keep track of all of the files, file data, and the directories within it).

While it may be possible to impose (at least for some filesystem operations), a strict ordering between the logical locks and physical locks as described above, there are many situations wherein multiple locks of the same class (logical, physical) need to be acquired and held for some overlapping interval of time, with no readily available lock ordering within each class to ensure deadlock free operation. It is possible to acquire all locks (in both the logical and physical lock classes) for each filesystem operation under the auspices of but a single lock transaction, using the same lock priority. This approach, however, increases the chances that the transaction is forced to roll back in response to some other conflicting transaction by another thread or node in the cluster.

To reduce the chances of such rollbacks occurring, one exemplary embodiment acquires the logical locks as part of a single lock transaction. Then, the physical locks are subsequently acquired as part of a second lock transaction in which the lock priorities available for assignment for this second class of lock operations, take precedence over any lock priorities allocated for lock operations of the first class (the logical locks). In this way, a filesystem operation begins by competing against other contending filesystem operations in the same logical lock acquisition phase. Once the operation acquires the necessary logical locks, the operation will not be forced to rollback all work done under the protection of the filesystem logical locks when it subsequently goes to complete its work acquiring the necessary physical locks.

In both models (the single lock transaction model and the two lock transaction model), the filesystem operation being conducted is committed as a single journal transaction. The key difference between the two models is that by breaking the filesystem operation into two principal stages (i.e., two lock transactions from the point of view of the local lock manager), the likelihood of rollbacks occurring within a given filesystem operation is reduced.

To implement such models, one exemplary embodiment uses multiple lock priority classes. Here, all lock priorities allocated from class N when compared against any lock priority from any of the lower classes [0 . . . N−1] result in the lock priority from class N "winning" or taking precedence. The losing lock priority in any such comparison is forced to rollback all state built up under the protection of the "losing" lock transaction.

To maximize the available unique lock priority values that can be awarded across the multiple numbers of lock priority classes within the limited number of bits available to encode a lock priority, one exemplary embodiment implements a special case maximum lock priority. Here, a single lock priority value takes precedence over all other local priorities from all available lock priority classes.

The utility of a special otherwise reserved maximum lock priority is made clear when the membership of the cluster changes (e.g., nodes are added and/or deleted). Such changes occur for a variety of reasons. In the case of nodes being deleted from the cluster membership, this can sometimes be the result of hardware or software failure in which a node "crashes." In clustered filesystems, if a crashed node was previously accessing or modifying the filesystem, a recovery operation is commenced to account for the sudden deletion of the node that crashed.

During such recovery, it may be necessary for a specific surviving node performing filesystem recovery operations to rollback incomplete, conflicting filesystem transactions that were in flight by other surviving nodes at the time of the cluster membership change. The need to perform this rollback or not perform this rollback depends upon the filesystem implementation. In filesystem implementations in which such a rollback can occur, exemplary embodiments recognize and support a unique maximum lock priority value that cannot be allocated during normal operation. This maximum lock priority value, assignable to lock transactions made only during filesystem recovery, thus allows a specific node doing filesystem recovery operations to take precedence against any other filesystem operations previously in flight by the surviving nodes of the cluster.

By implementing this special maximum lock priority value as a single value, one exemplary embodiment frees up or enables all other bit combinations of lock priority values to describe lock priorities allocated from the various lock priority classes.

One exemplary embodiment encodes a unique lock priority value that indicates that no lock priority is assigned. Here, the reservation of a single bit combination indicates that no lock priority is assigned and avoids needing yet another bit elsewhere in a lock request message to separately indicate that no lock priority is assigned to the lock request.

With exemplary embodiments, all lock request messages can have a lock priority field which encodes either:

1) no lock priority is assigned to the lock request,
2) the maximum special-purpose lock priority, or 3) a unique lock priority is assigned to this lock request from one of the lock priority classes.

In one exemplary embodiment, lock priorities are handed out or distributed within a single node in ascending order from the group of lock priorities last granted to the node. Exemplary embodiments further are able to resolve ties between two or more nodes using the same "base" lock priority value (i.e., ones allocated from the group of lock priorities last handed out to all nodes as a result of the most recent request by any node in the cluster to obtain a new lock priority group). Specifically, exemplary embodiments encode the unique identity of the node whereupon the lock priority was allocated. This is accomplished by including the rank ordering of the node within the cluster membership which allocated the lock priority as part of the lock priority value.

In one embodiment, the node rank is placed in the lower order bits of the resulting lock priority value. Placing the node rank in this location makes the comparison of two lock priority values simpler than some other encoding choices, since this encoding choice naturally allows for the effective "interleaving" of lock priority values as they are allocated across the nodes (presuming roughly equal rates of lock priority allocation across the nodes).

Furthermore, as noted, exemplary embodiments include an indication of the class from which the lock priority has been allocated. Multiple lock priority classes are used by the filesystem to reduce the probability of rollbacks (and the work incurred if such a rollback actually happens). Hence, the class of the lock priority is encoded in the computed lock priority value.

A comparison of lock priorities considers the class of each lock priority being compared. If the classes differ, the comparison is based entirely on the precedence ordering of the lock priority classes of the two lock priorities being compared. On the other hand, if the classes are the same, then the comparison simply compares the two values without having to mask out the lock class values of the two lock priorities being compared. In this latter situation, accommodation is made for the wrap of lock priority numerical values that can ultimately occur when the use of lock priorities has been sufficient to completely cycle through the range of all possible lock priority group sets before starting over. Theoretically, this means that delayed lock transactions could lose priority when compared to lock priority values more recently allocated. This situation, however, is avoided by making lock priority values large enough (for example, making lock priority values 32 bits). Of course, this value can change and can be chosen according to the frequency and duration of lock requests in a given application.

With exemplary embodiments, lock priority values are not necessarily allocated or provided by incrementing upwards or downwards through the group of lock priorities granted to all nodes whenever any node exhausts the most recently granted group (or "batch") of lock priorities given to all nodes. For example in one embodiment, a stair step modulus function advances through the group of lock priorities granted to all nodes. Exemplary embodiments can be made to work with any of these policies using a suitable implementation of the lock priority comparison function that determines the "greater" or "lesser" priority relation between two lock priorities so computed.

With exemplary embodiments, a distinction is made between the actual numerical value of a lock priority value and the priority that the lock priority value encodes. These values may be the same, or they may be different, depending upon the detailed numerical encoding of a lock priority value. In one embodiment, lock priority values are computed to represent the time order of their allocation. Here, younger lock priorities (those more recently allocated) have lower precedence when compared to older lock priorities (those which were allocated further back in time).

Furthermore, one exemplary embodiment chooses to award and maintain lock priority groups on a filesystem-by-filesystem basis. Thus, rapid operation in one filesystem does not artificially force other filesystems in the cluster to more rapidly run through their respective groups (or batches) of lock priorities.

The cardinality of the lock priority group (or "batch") that is awarded to all nodes whenever any node for a given cluster and filesystem membership exhausts its lock priority group is something that can be tuned. Handing out large lock priority groups in the presence of significantly unequal filesystem workloads distributed across the cluster nodes, increases the time interval during which the busier nodes allocate lock priorities which (by virtue of their greater numerical value), "lose" to any conflicting filesystem operations of the more idle nodes which are more sedately consuming the same lock priority group granted from the GLM. Handing out smaller lock priority groups when replenishment is required can minimize such unevenness, at the penalty of more frequent requests to obtain the next lock priority group. Dispersing of such groups of priorities can be tuned, perhaps even at runtime on a filesystem by filesystem basis, depending upon lock priority consumption rates and other tuning policies.

In one exemplary embodiment, the cluster storage system includes multiple file systems that each operate independently of each other. Groups of lock priorities only need to apply to a single specific filesystem. Hence, whenever a new group of lock priorities is needed, the GLM only needs to grant the new group of lock priorities to the set of nodes in the cluster which are accessing the filesystem in question.

Lock priorities are assigned to transactions. All locks acquired for a transaction then use the priority so assigned to the transaction upon whose behalf the lock is being acquired. The transactions are assigned lock priorities, and one or more threads execute each such transaction (and hence all lock requests for a given transaction).

DEFINITIONS

As used herein and in the claims, the following words are defined:

A "cluster" is a group of two or more computers that work closely together so that in many respects, they operate in a manner similar to a single computer. For example, a cluster can be formed by linking multiple computers through a fast local area network (LAN). In combination with appropriate software, the resulting cluster can then deliver improved performance and/or availability over a single computer.

A "deadlock" occurs when two or more threads of execution are stuck waiting for each other to finish or release a resource. In the context of lock operations, a deadlock is the acquisition of two or more conflicting locks when one or more of the locks cannot be acquired until another conflicting lock L is released, with L held by a thread seeking to acquire conflicting locks held by one or more threads awaiting acquisition of the lock L. Deadlocks can thus occur in a multi-threaded system when multiple threads share a specific type of mutually exclusive resource. A deadlock occurs in the following example: A first thread acquires a lock to obtain exclusive access to a first table in a database, and a second thread acquires a lock to obtain exclusive access to a second table. A deadlock occurs when the first thread attempts to obtain a lock on the second table while the second thread attempts to obtain a lock on the first table.

A "filesystem" or "file system" is a collection of file data, maintained by a filesystem implementation which is a set of data types, methods, and algorithms (typically implemented within an operating system instance) that store, organize, and maintain file data, frequently in some kind of file and/or directory hierarchy (albeit various alternatives and choices exist in the exact organizational structure made manifest by the filesystem implementation to the consumers of the file data). The actual file data and associated filesystem meta-data which describe the location, layout, directory organization, etc. of all file data within the filesystem is in turned stored on a data storage device (e.g., single hard disk, CD-ROM, disk storage array, network attached storage (NAS), etc.).

A "lock" is a synchronization method to enforce limits on access to, and to maintain the coherency of shared resources, such as storage devices, in a network system having multiple threads of execution. For example, threads or processes obtain the necessary locks before performing operations to read or modify shared filesystem state or shared database state, such that access to such shared state remains coherent in the presence of otherwise competing activity (such as performing a read and/or write operation).

A "process" is an instance of a computer program that is executed by a computer that can concurrently run several computer programs. A computer program is a passive collection of instructions or code, whereas a process is the execution of such instructions or code. Multiple processes can be associated with a same computer program or with different computer programs. A process can split itself into multiple sub-processes or "threads" that execute in parallel and run the same or different instructions.

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

A "thread" or "thread of execution" is a process or program that is split into two or more simultaneously running tasks (i.e., program instructions or execution paths through address space). A thread differs from a process. Typically, processes are independent, carry considerable state information, have their own respective, separate address space, and interact through system provided inter-process communication mechanisms. On the other hand, threads typically share state information of a process and directly share memory and other resources of their containing process.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. For example, the software is implemented as one or more modules. The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using its connection to memory. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, at a local lock manager (LLM) of a node in a clustered file system, a set of logical lock priorities and a set of physical lock priorities from a global lock manager (GLM), the set of physical lock priorities having priority over the set of logical lock priorities in granting access to data in the clustered file system; and
issuing, at the LLM, a first logical lock priority from the set of logical lock priorities and a first physical lock priority from the set of physical lock priorities to a first file system state transaction to access particular data in the clustered file system.

2. The method of claim 1, wherein at least one of the first logical lock priority and the first physical lock priority is encoded using 32 bits and does not rely on time being synchronized across nodes of the clustered file system.

3. The method of claim 1, wherein two operations with different transactions beginning at a same time within a same node have unique lock priority values describing a precedence relation between the different transactions to resolve any subsequent locking conflict between the different transactions.

4. The method of claim 1 further comprising, issuing the set of logical lock priorities in a non-consecutive numerical order that increases over time.

5. The method of claim 1 further comprising:
detecting, by the LLM, that a higher-priority filesystem state transaction is attempting to acquire a lock held by a lower-priority filesystem state transaction;
instructing the lower-priority transaction to abort.

6. The method of claim 1 further comprising:
issuing a second logical lock priority from the set of logical lock priorities and a second physical lock priority from the set of physical lock priorities to a second file system state transaction to access the particular data,
wherein the first logical lock priority has a higher priority than the second logical lock priority, and the second physical lock priority has a higher priority than the first physical lock priority,
and wherein the second file system state transaction is granted access to the particular data over the first file system state transaction.

7. The method of claim 1, wherein the first logical lock priority enables the first file system state transaction to access a logical storage region in the clustered file system.

8. The method of claim 1, wherein the first physical lock priority enables the first file system state transaction to access a particular data block in the clustered file system.

9. The method of claim 1, wherein at least one of either the first logical lock priority and the first physical lock priority comprises a transaction identifier to identify an association with the first file system state transaction.

10. A node in a cluster storage system, comprising:
a processor; and
a Global Lock Manager (GLM) executable on the processor to distribute a set of logical lock priorities and a set of physical lock priorities to a particular local lock manager (LLM) of a plurality of LLMs.

11. The node of claim 10, wherein at least one of the set of logical lock priorities and the set of physical lock priorities is distributed across the cluster storage system in a non-consecutive numerical order that increases over time.

12. The node of claim 10, wherein at least one of the set of logical lock priorities and the set of physical lock priorities is transmitted to all of the plurality of LLMs in response to a request from the particular LLM for a single lock priority.

13. The node of claim 10, wherein the GLM is to hold all sets of the logical lock priorities and the physical lock priorities for the plurality of LLMs.

14. The node of claim 10, wherein the cluster storage system includes multiple file systems that operate independently of each other and the set of logical lock priorities and the set of physical lock priorities only apply to a single file system in the cluster storage system, and where, correspondingly, the plurality of LLMs have access to the single filesystem.

15. The node of claim 10, wherein at least one of the set of logical lock priorities and the set of physical lock priorities is not dependent on absolute time or ordering but instead generally increases over time until a maximum numerical lock priority value (MNLPV) is reached.

16. A tangible computer readable storage medium having instructions for causing a computer to:
receive, at a Local Lock Manager (LLM) located in a node of a cluster in a cluster file system, a first set of logical lock priorities and a first set of physical lock priorities from a global lock manager (GLM), the first set of physical lock priorities having priority over the first set of logical lock priorities in granting access to data in the clustered file system; and
issue, at the LLM, a particular logical lock priority from the first set of logical lock priorities and a particular physical lock priority from the first set of physical lock priorities to a file system state transaction to access particular data in the clustered file system.

17. The tangible computer readable storage medium of claim 16, wherein the instructions cause the computer to further request, from the LLM to the GLM, a second set of logical lock priorities and a second set of physical lock priorities after the first set of logical lock priorities and first set of physical lock priorities last granted from the GLM to the LLM have been consumed.

* * * * *